Patented Dec. 7, 1948

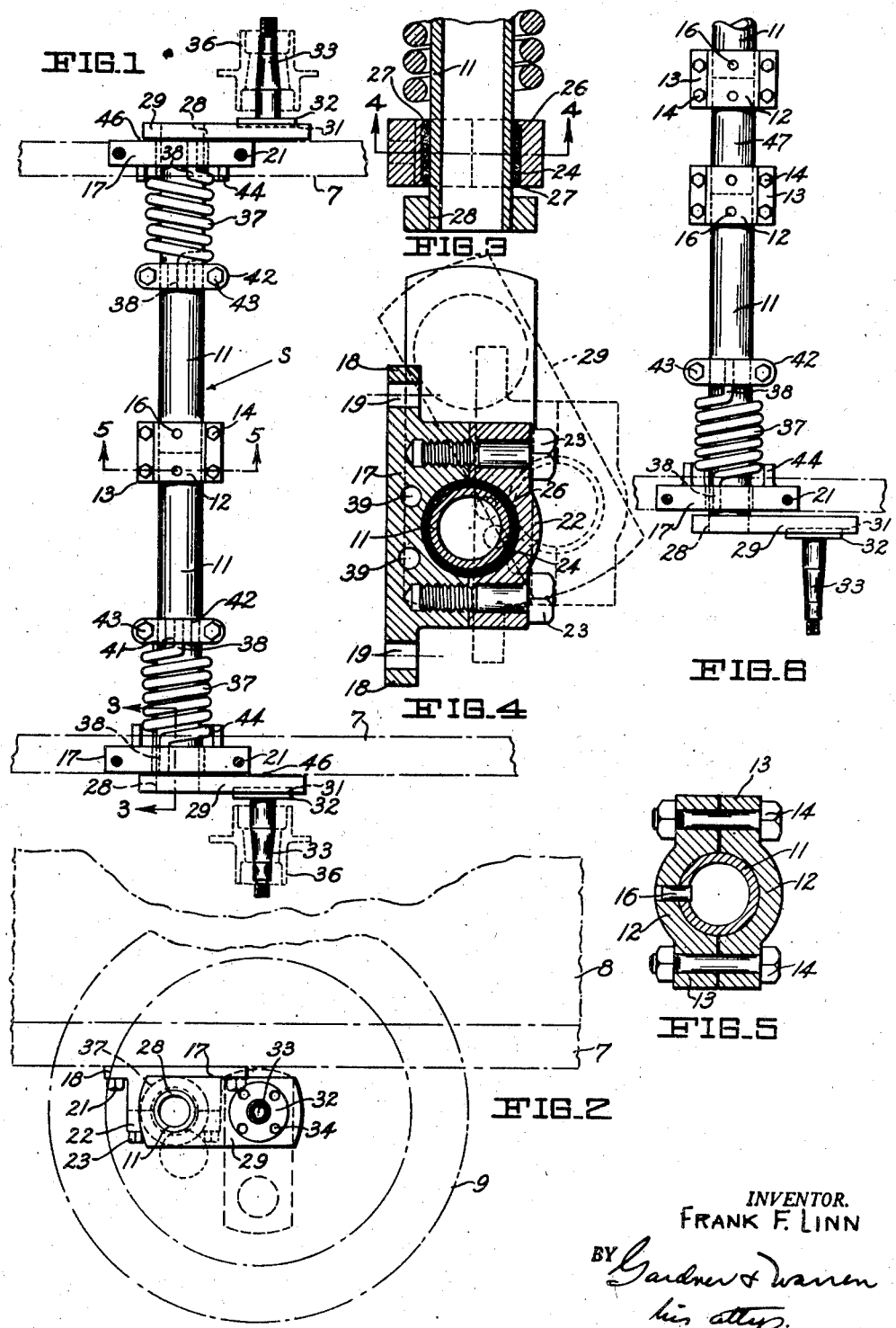

2,455,787

UNITED STATES PATENT OFFICE 2,455,787

TRAILER AXLE

Frank F. Linn, Walnut Creek, Calif., assignor to Frank F. Linn Corporation, a corporation of California Application September 24, 1945, Serial No. 618,250

5 Claims. (Cl. 267—53)

This invention relates to wheel-supporting axles and has particular reference to the type used with trailers or other similar vehicles.

It is an object of the invention to provide an axle which may be securely bolted or otherwise attached to the trailer frame or body and yet which will provide a shock-absorbing spring mounting for the vehicle wheels.

Another object of the invention is to provide a trailer axle designed to place the center of gravity of the normal trailer load materially closer to the surface of the road than is the case in the usual spring-equipped trailer.

A further object of the invention is to provide, in a trailer axle equipped with separate load-bearing springs, means to equally apportion any overloads, which may be caused by weight distribution or shock imposed on one wheel, between the respective springs associated with both wheels.

Yet another object of the invention is to provide, in a trailer axle equipped with load-bearing springs capable of resisting deflection within a prescribed load range, means to variably adjust said springs so as to increase their resistance to deflection within said range.

A still further object of the invention is to provide, in a trailer axle, a spring structure which cannot become overflexed by increased uniform or shock loads.

It is another object of the invention to provide in a trailer axle provided with flexible load-bearing springs, structure which permits a greater flexure of the spring at minimum load level and lesser flexure thereof as the load increases.

It is a further object of the invention to provide, in a trailer axle fitted with load bearing springs, means to resist bilateral movement of the axle under road shocks so as to lessen the shock force on the springs.

The invention possesses other objects and features of advantage some of which, together with the foregoing, will be specifically set forth in the detailed description of the invention hereunto annexed. It is to be understood that the invention is not to be limited to the specific form thereof herein shown and described as various other embodiments thereof may be employed within the scope of the appended claims.

Referring to the drawing:

Figure 1 is a top plan view of the complete axle structure of my invention. Overlying portions of the trailer body are shown in dot and dash lines.

Figure 2 is an end elevational view of the structure shown in Figure 1.

Figure 3 is a fragmental vertical sectional view, to an enlarged scale, taken in the plane indicated by the line 3—3 of Figure 1.

Figure 4 is an enlarged vertical sectional view taken in the plane indicated by the line 4—4 of Figure 3.

Figure 5 is a vertical sectional view, to an enlarged scale, taken in the plane indicated by the line 5—5 of Figure 1.

Figure 6 is a fragmental top plan view, similar to Figure 1, showing a modified form of structure.

Describing the invention in detail, I have shown in Figure 1 a pair of parallel members 7 indicative of frame rails or other such parts employed to support the trailer body 8 shown in Figure 2. Since these parts, together with the wheels 9, form no part of the actual axle structure, they have been indicated in dot and dash lines. Extending transversely across and below the trailer body 8 is a shaft S comprising a pair of axially aligned tubular shaft members 11 connected together at their abutting ends by a clamping device best shown in Figure 5 and comprising a pair of opposed saddles 12 provided with oppositely extending flanges 13 drilled to received bolts 14 by means of which the saddles may be tightly compressed against the shaft members. One saddle is provided with dowel pins 16 adapted to enter receiving apertures drilled in the shaft members so as to lock the latter together against relative rotational movement and thus secure them together as a unit.

Means are provided for mounting the combined shaft members 11 on the trailer and for permitting rotational movement thereof. Disposed adjacent the outer end of each shaft member is a bearing comprising a base section or body portion 17 provided bracket means for attachment to a vehicle and herein the form of flanges 18 having apertures 19 therein for receiving bolts 21 employed to securely fix the base section to the trailer frame 7 or to any other convenient portion of the body structure. A removable cap 22 is secured by cap-screws 23 to the base section 17. The assembled base section and cap, as shown in Figure 4, are bored to receive the shaft member 11 with the axis of the latter coinciding with the parting plane of the bearing members. The bearing bore is provided with a peripheral recess 24 in which a strip 26 of friction material, such as brake lining, may be placed; the flanges 27 at the opposite sides of the recess 24 serving to retain the strip against displacement axially of the shaft member.

The extreme end of each shaft member 11, extending outwardly beyond the bearing, is welded or otherwise secured in the bore 28 of a radially extending lever 29 provided adjacent its outer end with a counterbore 31 in which the flange 32 of a spindle 33 may be secured by rivets or bolts 34. The spindle, which is thus radially offset from and parallels the shaft member 11, serves to journal the hub 36 of the trailer wheel 9. The arrangement of the parts is such that the rotational center of each wheel 9, represented by the axis of the spindle 33, may describe an orbital arc about the axis of the shaft member 11 as a center from its normal position of rest which is substantially as shown in Figure 2.

Means is provided for yieldably resisting rotational and axial movement of the shaft members in their bearings. Surrounding each shaft member and positioned adjacent the inner face of the bearing, is a comparatively heavy coil spring 37 having axially extending terminal portions 38 of each end coil anchored, respectively, in one of a pair of apertures 39 provided in the base section 17 of the bearing and in an aperture 41 provided in a split collar 42 which is clamped to the shaft member by bolts 43. The springs, it will be noted by reference to Figure 1, are right and left hand wound. Referring to Figure 2 it will be seen that when a load is placed in the trailer body 8, the latter will tend to descend toward the road surface and in so doing will move the levers 29 about a fulcrum represented by the common axis of the spindles 33. This will create rotational movement of the shaft members 11 in their bearings and will create torque in the springs 37 by the winding action imposed thereon incident to the shaft rotation, which winding will continue until counterresistance is offered by the spring sufficient to balance the load on the trailer. During the action of winding the spring, the latter will have a tendency to shift transaxially and rub against the shaft member. This is due to the fact that the twisting stress is applied at the terminal portions 38 and will, especially adjacent the bearing, cause an undesirable rubbing between the spring and shaft. I overcome this however by providing each base section 17 with lugs 44 or their equivalent which engage the first coil of the spring and maintain the latter substantially centralized with respect to the shaft member. It will be noted that as the levers start their pivotal movement from their normal position of rest, shown in Figure 2 and wherein no load stress other than that of the empty trailer is imposed on the springs 37, a comparatively small additional load will cause a fairly large movement of the lever 29. However the imposition of more load on the trailer will cause a gradually diminishing movement of the lever until, when the lever has reached a perpendicular position as indicated by the dotted lines of Figure 2, it will be impossible to cause further flexing of the spring since the pressure plane vertically intersecting the axis of the shaft members 11 will then have become coincident with the vertical plane intersecting the axis of the wheels 9. Beyond this point no amount of overloading will have any effect on the springs.

Unrestrained shock loads are the principal factor contributing to fatigue or failure of torsion springs. The axle of my invention is designed particularly to counteract the normally encountered shocks caused by depressions, such as severe road ripples or chuck holes, or obstructions such as large rocks and the like. It will be noted that when the trailer is under load, the peripheral portions of the shaft members 11 within the bearings 17—22 will exert considerable upward pressure, toward the base section 17, on the brake lining 26. This will create a drag, proportionate to the load, on the shaft and will materially reduce in sharpness the suddenness of rotational stops and starts of the latter particularly under the aforesaid shock load conditions. Of equal importance is the functioning of the brake lining as a bearing which does not require attention or lubrication. The shaft bearing structure also has a definite bearing on the riding qualities of the trailer in that the wheels are not permitted, as in a freely sprung trailer, to more or less identically trace the contour of a rippled or rough road but rather are limited in their frequency of undulation so that harmful fundamental or harmonic frequencies are effectively broken up.

In addition to the above, the very important feature of load proportioning between the two springs is provided. It will be seen that when one of the levers 29 is moved, due to a change in load conditions, a corresponding and equal movement in the other lever will occur as a result of torque transmission through the shaft members 11. This, of course, will flex each spring 37 equally and will equally reflect any further vertical movements in either wheel 9. This feature has a tendency to prevent sidewise rocking of the trailer in the event that one wheel should suddenly rise or fall due to encountering a projection or depression in the road since the solid interconnection between the wheel levers, represented by the shaft members 11, will create a like rise or fall of the other wheel. This will cause the trailer to roll over comparatively rough roads on a substantially even keel. In connection with this it will be noted that a space 46 is provided between the inner face of each lever 29 and the confronting face of the bearing 17—22. This permits a certain amount of axial movement of the shaft members 11 which may be resisted to a predetermined degree by compression of the springs 37 so as to cushion sidesway forces set up when the trailer is negotiating curves or is called upon to execute sudden turns.

The springs may be adjustably positioned so as to primarily position the levers 29 at a selected point along their normal paths of travel or to extend the latter. In some instances it may be desired to extend the overall flexure of the spring so that loads which would normally bring the levers 29 to their vertical positions, as indicated in Figure 2, will still remain spring supported. This may be accomplished by loosening the bolts 43 of the split collars 42 and rotating the latter relative to the shaft members in a clockwise direction, as viewed in Figure 2, until the levers have been given a setting which produces the desired elevation of the trailer body 8 to give the required total load deflection, after which the bolts 43 are tightened to re-secure the split collars. In other instances it may be desired to lower the center of gravity of the trailer below its normal unloaded point which may be accomplished by releasing the split collars 42 as above described and allowing the trailer body to drop to the desired position approaching or incident with its lower limit of travel.

In the event of spring failure, the latter may be easily removed and replaced by removing the saddles 12 and the adjacent split collar 42 and sliding the shaft members 11 apart whereupon the old spring may be slid along its shaft member and removed at the gap existing between the confronting ends of the members, the new spring being mounted by reversely repeating the preceding steps.

Figure 6 illustrates a method of obtaining variable tread or transverse spacing between the wheels 9 which may be necessary in adapting the axle to trailers designed for special purposes. In this structure I provide an insert extension member 47 which may be positioned between the normally abutting ends of the shaft members 11 and which is provided with apertures for receiving the dowel pins 16 of the saddles 12, two complete units of the latter being employed in this special axle.

Having thus described my invention in detail, what I claim as new and desire to secure by Letters Patent is:

1. A vehicle axle comprising, a shaft, radially projecting levers mounted on said shaft adjacent the opposite ends thereof and secured by said shaft for simultaneous joint movement in the same direction therewith, a wheel spindle secured to each of said levers in offset parallel relation to said shaft, bearings on said shaft adjacent said levers and being formed with bracket means for securing said bearings directly to a vehicle body, helical springs surrounding said shaft with one end of each of said springs adjacent one of said bearings, said bearings being formed to engage and secure said adjacent spring ends, and means on said shaft for engaging and securing the opposite ends of said springs to said shaft.

2. A vehicle axle comprising, a shaft, levers mounted on said shaft adjacent the opposite ends thereof and secured by said shaft for simultaneous joint movement in the same direction therewith, a wheel spindle secured to each of said levers in offset parallel relation to said shaft, bearings comprising complementary body and cap portions mounted on said shaft adjacent said levers, means provided on said bearing body portion for mounting said shaft to a vehicle, helical springs surrounding said shaft with one end of each of said springs adjacent one of said bearings, means securing said spring end to said adjacent bearing, and means securing the opposite end of said spring to said shaft.

3. A vehicle axle comprising, a shaft, radially projecting levers mounted on said shaft adjacent the opposite ends thereof and secured by said shaft for simultaneous joint movement in the same direction therewith, a wheel spindle secured to each of said levers in offset parallel relation to said shaft, bearings on said shaft adjacent said levers for rotatably mounting said shaft to a vehicle, helical springs surrounding said shaft with one end of each of said springs adjacent one of said bearings, the end of each of said bearings facing said springs being formed with a longitudinally extended opening, said adjacent spring end being bent at substantially right angles to the plane of the contiguous spring convolution and inserted and secured in said bearing opening to prevent relative rotation between said bearing and spring end, and means on said shaft securing and anchoring the opposite ends of said springs to said shaft.

4. A vehicle axle comprising, a shaft, radially projecting levers mounted on said shaft adjacent the opposite ends thereof and secured by said shaft for simultaneous joint movement in the same direction therewith, a wheel spindle secured to each of said levers in offset parallel relation to said shaft, bearings each comprising complementary body and cap portions mounted on said shaft adjacent said levers, said body portion being formed for attachment to the underside of a vehicle body, helical springs surrounding said shaft adjacent said bearings, the opposite ends of said springs being bent from the planes of the contiguous spring convolutions, said bearing body portions each being formed with means for engaging and anchoring against relative rotation the adjacent spring end, and means on said shaft for securing thereto for joint movement the opposite ends of said springs.

5. A vehicle axle comprising, a shaft, levers mounted on said shaft adjacent the opposite ends thereof and secured by said shaft for simultaneous joint movement in the same direction therewith, a wheel spindle secured to each of said levers in offset parallel relation to said shaft, bearings each comprising complementary body and cap portions mounted on said shaft adjacent said levers, said body portion being formed for attachment to the underside of a vehicle body, helical springs surrounding said shaft with one end of each of said springs adjacent one of said bearings, means for securing said spring end to said adjacent bearing body portion, means extending longitudinally from each of said bearing body portions and engaging the adjacent spring convolution and supporting said convolution in spaced substantially concentric relation to said shaft, and means on said shaft and securing thereto for joint movement the opposite ends of said springs.

FRANK F. LINN.

REFERENCES CITED

The following references are of record in the file of this patent:

UNITED STATES PATENTS

| Number | Name | Date |
|---|---|---|
| 41,404 | Taber | Jan. 26, 1864 |
| 2,068,676 | Hickman | Jan. 26, 1937 |
| 2,023,254 | Stimson | Dec. 3, 1935 |
| 2,104,736 | Clemons | Jan. 11, 1938 |
| 2,109,311 | Dayton | Feb. 22, 1938 |
| 2,117,401 | Cobb | May 17, 1938 |
| 2,286,609 | Ledwinka | June 16, 1942 |
| 2,379,478 | Delp | July 3, 1945 |
| 2,386,988 | Sullivan | Oct. 16, 1945 |
| 2,409,501 | Krotz | Oct. 15, 1946 |

FOREIGN PATENTS

| Number | Country | Date |
|---|---|---|
| 342,649 | France | July 13, 1904 |
| 636,972 | Germany | Oct. 20, 1936 |
| 667,639 | France | June 21, 1929 |